United States Patent [19] [11] 4,402,656

Schott, Jr. [45] Sep. 6, 1983

[54] CONTROL OF TUBULAR FILM SIZE

[75] Inventor: Charles M. Schott, Jr., Atkinson, N.H.

[73] Assignee: Gloucester Engineering Co., Inc., Gloucester, Mass.

[21] Appl. No.: 250,617

[22] Filed: Apr. 3, 1981

Related U.S. Application Data

[63] Continuation-in-part of Ser. No. 964,983, Nov. 30, 1978, abandoned.

[51] Int. Cl.[3] .......... B29D 23/04

[52] U.S. Cl. .......... 425/140; 264/40.2; 264/564; 425/72 R; 425/163; 425/172; 425/326.1

[58] Field of Search .......... 425/140, 326.1, 141, 425/162, 163, 172; 264/40.2, 40.3, 40.1, 563-569

[56] References Cited

U.S. PATENT DOCUMENTS

| | | | |
|---|---|---|---|
| 2,816,837 | 12/1957 | Holsman | 425/140 |
| 2,952,875 | 9/1960 | Herrick | 425/140 |
| 3,159,698 | 12/1964 | Suh et al. | 264/210 R |
| 3,170,011 | 2/1965 | Cheney et al. | 264/564 |
| 3,400,184 | 9/1968 | Matsuo et al. | 264/569 |
| 3,474,160 | 10/1969 | Doering | 264/401 |
| 3,499,064 | 3/1970 | Tsuboshima et al. | 425/140 |
| 3,513,501 | 5/1970 | Hearns | 425/140 |
| 3,700,370 | 10/1972 | Hearns et al. | 425/140 |
| 3,932,080 | 1/1976 | Uemura et al. | 425/140 |
| 3,974,248 | 8/1976 | Atkinson | 425/162 |
| 3,980,418 | 9/1976 | Schott, Jr. | 425/455 R |
| 4,201,741 | 5/1980 | Pannenbecker | 425/140 |
| 4,243,363 | 1/1981 | Mulcahy | 425/326.1 |

FOREIGN PATENT DOCUMENTS

| | | | |
|---|---|---|---|
| 51-5021 | 2/1976 | Japan | 264/569 |
| 1038298 | 8/1966 | United Kingdom . | |

*Primary Examiner*—Jeffery R. Thurlow

[57] ABSTRACT

An internally-cooled blown-film system, for producing plastic tubing, in which the flow rate of the continuous flow of internal cooling air, by non-contacting, energy beam sensor means, is made directly dependent upon the deviation in position of the tube wall.

12 Claims, 9 Drawing Figures

FIG 6
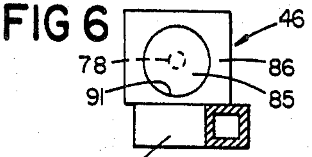
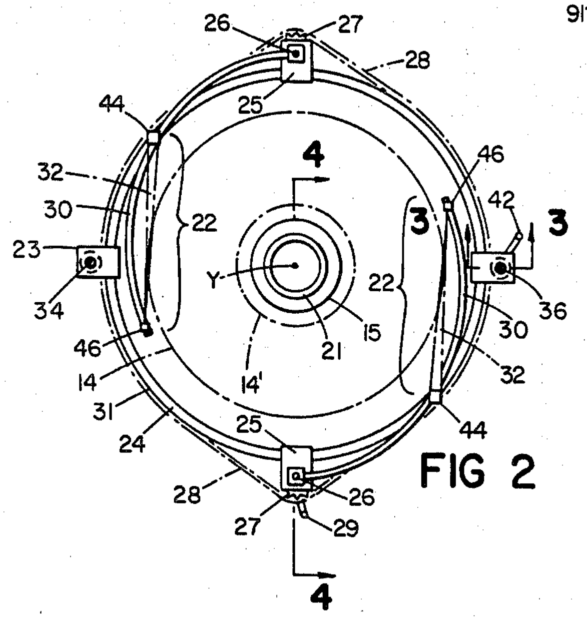
FIG 2
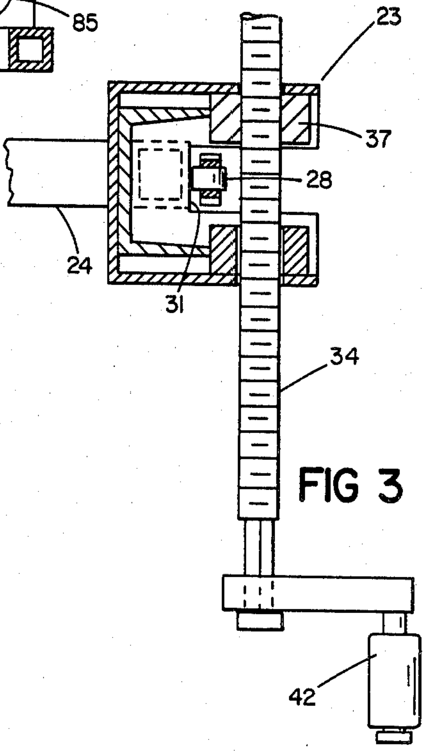
FIG 3
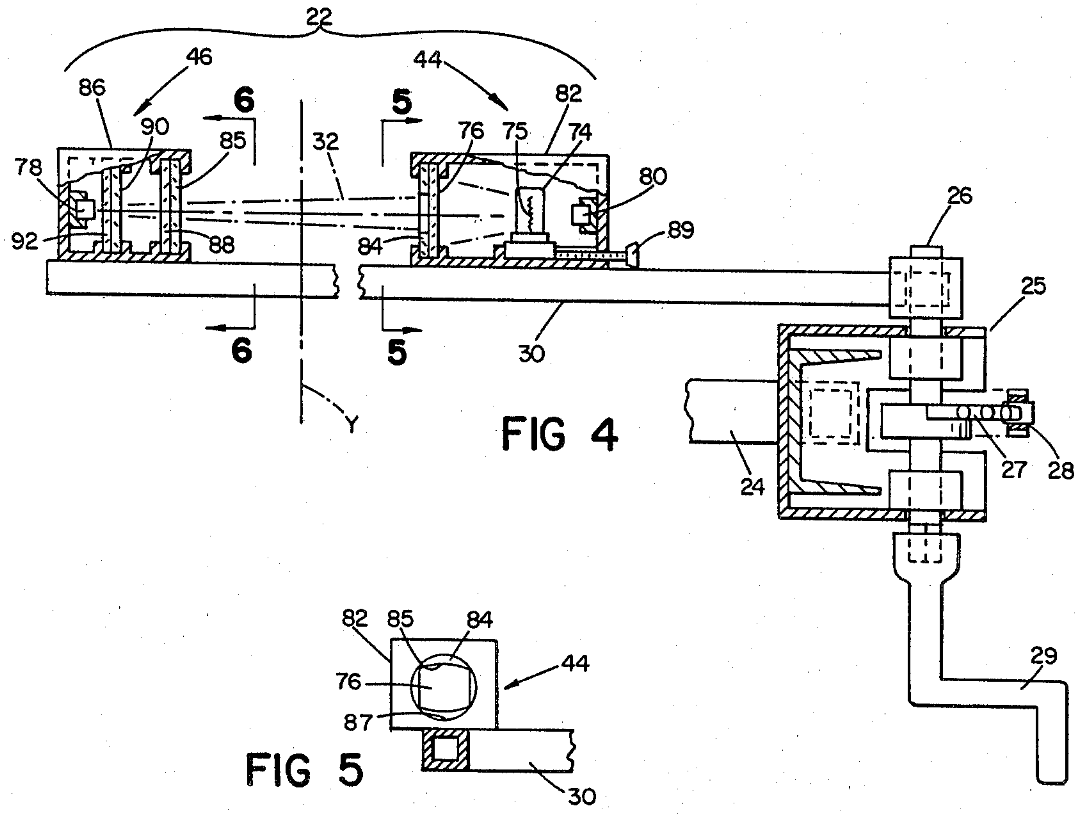
FIG 4
FIG 5

FIG 8
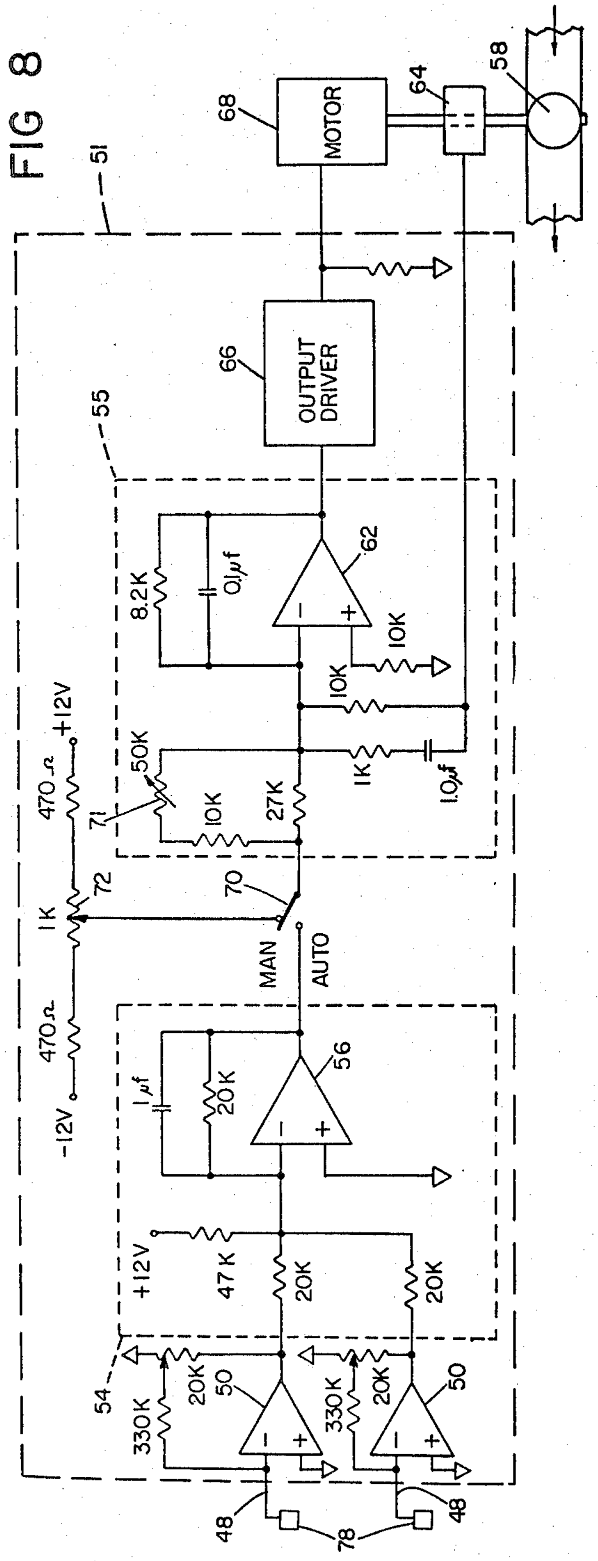
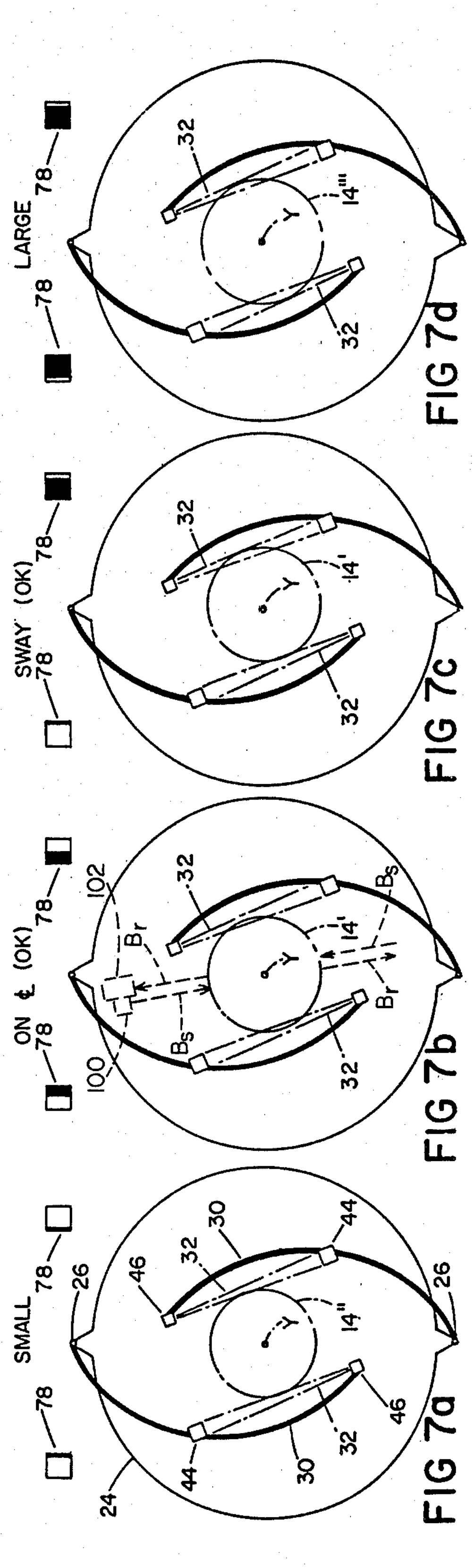
FIG 7a
FIG 7b
FIG 7c
FIG 7d

CONTROL OF TUBULAR FILM SIZE

This is a continuation in part of U.S. patent application Ser. No. 964,983, filed Nov. 30, 1978, entitled "Optical Control of Tubular Film Size", now abandoned.

FIELD OF THE INVENTION

This invention relates to apparatus for controlling the circumference of blown film.

BACKGROUND OF THE INVENTION

Blown-film apparatus is used to manufacture plastic bags and the like. A molten tube of plastic is extruded from an annular die and then stretched and expanded to a larger diameter and a reduced thickness by the action of overhead nip rolls and internal air pressure. Where the film is to be wound in a roll, the annular die or the overhead nip rolls are slowly rotated to distribute film thickness irregularities caused by die imperfections. To control the circumference of the finished tube, it is generally necessary to adjust the volume of air captured inside the tube between the annular die and the overhead nip rolls. It has been conventional to adjust the entrapped volume of air by operating valves in the small inflation line connected to the tube interior. These valves were opened or closed in what is known as "bang-bang" control in response to measurements of tube size.

Some of these inflation systems measured tube size using optical beams tangent to the tube and incident upon photocells. For example, Uemura et al. U.S. Pat. No. 3,932,080 shows two photocell limit beams tangent to the oversize and undersize limits of the tube. One photocell opens the on-off valve in the air supply line when its beam is able to pass by the tube and be detected, corresponding to a reduction in tube size. The other cell opens the on-off valve in the vacuum line when its beam is obscured by the tube, corresponding to an increase in tube size. Another reference showing a "bang-bang" photocell system is Suh et al. U.S. Pat. No. 3,159,698. And Tsuboshima et al. (U.S. Pat. No. 3,499,064) and Matsuo et al. (U.S. Pat. No. 3,400,184) each shows a single photocell and beam for controlling the inflation pressure inside the tube.

In certain instances the geometry of the extruding bubble may vary due to shift in the frost line. The invention can be utilized in a number of ways in this event, for instance an elevator may be employed to raise or lower the sensing device to ensure that it is acting upon the tube in a region where meaningful information can be derived.

Mechanical feelers have also been used to control the entrapped volume with "bang-bang" control. For example, Hearns et al. U.S. Pat. No. 3,700,370 uses the voltage difference between the outputs of potentiometers at the feelers to drive a silicon controlled rectifier. A positive difference voltage, corresponding to a reduction in film size, causes the rectifier to energize an on-off solenoid valve in the air line. Sway of the tube, without any change in tube size, does not generate a difference voltage, and thus does not activate the solenoid valve. But using such mechanical feelers leaves deformations in the film.

To increase production speeds of blown film lines, a continuous stream of cooling air has been admitted through passages in the die, directed against the inner wall at the tube and removed through passages in the die. In such dies, in order to regulate the flow rate in a dynamic manner a mechanical feeler that follows the wall of the tube has been used. Schott U.S. Pat. No. 3,980,418, for instance, shows a single feeler mechanically connected to a pneumatic regulator valve which, through a pneumatic cylinder, proportionally controls a flapper valve in the internal air supply line. As with all mechanical feelers, however, deformations are left in the film and a degree of inaccuracy must exist due to the need of the film to apply pressure to the feeler in order to produce a response. Furthermore, with such feelers, tube size measurements may be made beyond the molten region of the tube to avoid serious deformations in the tube wall as the result of cooling by the feelers. Making the measurement away from the molten region introduces delay into the control system, and reduces accuracy.

SUMMARY OF THE INVENTION

I have discovered a simple means of maintaining the circumference of internally cooled blown film within smaller tolerances than heretofore possible, and without contacting the tube surface.

My invention features adjusting the flow rate of a continuous flow of internal cooling air dependently upon the output of two or more position sensors which rely on energy beams (e.g., light or sound) for detecting position. The sensors provide an output directly dependent upon and preferably proportional to the deviation in position of a portion of the tube wall, over a range of positions to either side of a predetermined set point. A control unit (e.g., electronic circuitry) combines the sensor outputs in such a way as to generate a signal insensitive to tube sway and representative of change in tube circumference.

Using such an energy-beam position sensor to make proportional measurements of tube size allows making the measurement at or upstream of the frost line that divides molten and solidified portions of the tube, thereby eliminating delay errors introduced by measuring at points further downstream on the solidified tube. Furthermore, the measurements are more accurate than those made with mechanical feelers because the problems of feeler arm inertia and tube wall flexibility are eliminated.

In preferred embodiments, means are provided to produce an electrical output which is linearly proportional to the deviation in wall position over the range of positions; each optical sensor includes an optical transmitter for effectively projecting a wide beam generally tangentially to the tube; tube wall position is measured as the percentage by which the beam width is occluded; an aperture mask is used to give the beam uniform energy incrementally across its width, to thereby achieve linearity between tube wall position and sensor output; coupled supports are provided for each sensor such that the sensors can be moved inwardly radially to adjust desired tube size and moved together longitudinally to adjust the location of the tube measurement; and an ultrasonic beam is sent and received radially with respect to the tube.

PREFERRED EMBODIMENT

The structure and operation of a preferred embodiment of the invention will now be described, after first briefly describing the drawings.

DRAWINGS

FIG. 2 is a horizontal cross-sectional view at 2—2 in FIG. 1, showing the tube wall position sensors.

FIG. 3 is a vertical cross-sectional view at 3—3 in FIG. 2, showing the height adjustment mechanism.

FIG. 4 is a vertical cross-sectional view at 4—4 in FIG. 2, showing the transmitter and detector of one sensor, and the sensor arm and associated arm rotation mechanism.

FIG. 5 is a vertical section view at 5—5 in FIG. 4, showing the transmitter.

FIG. 6 is a vertical section view at 6—6 in FIG. 4, showing the detector.

FIGS. *7a*, *7b*, *7c* and *7d* are diagrammatic plan views of the sensors for four different tube conditions, illustrating, by shading in the small squares, the fraction of the relatively wide optical beam occluded in each of the conditions.

FIG. 8 is a schematic view of the circuitry of the control apparatus.

Figure 1:
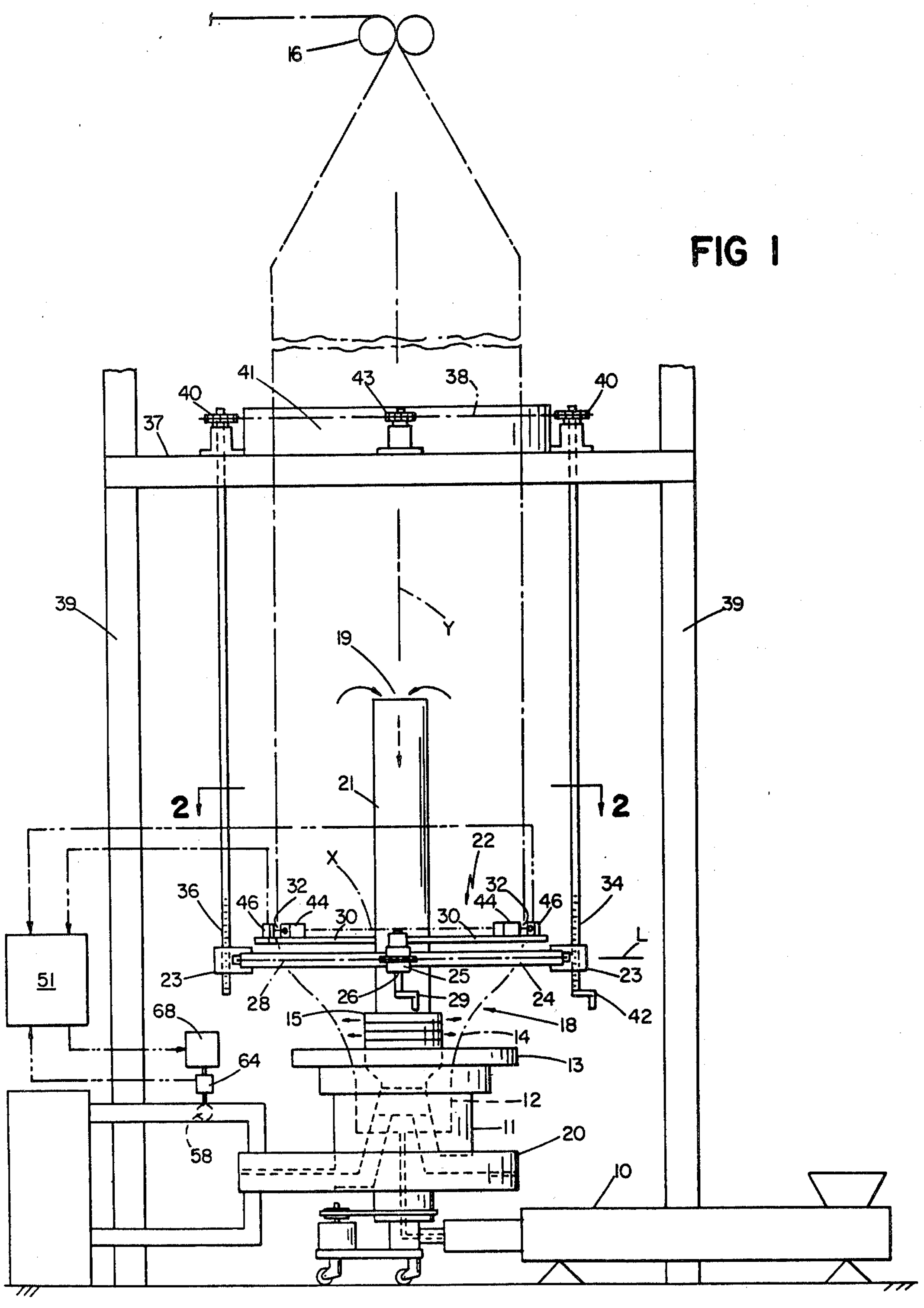
FIG. 1 is a diagrammatic elevation view of internally-cooled blown-film apparatus employing the tube circumference control apparatus of the invention.
Figure 9:
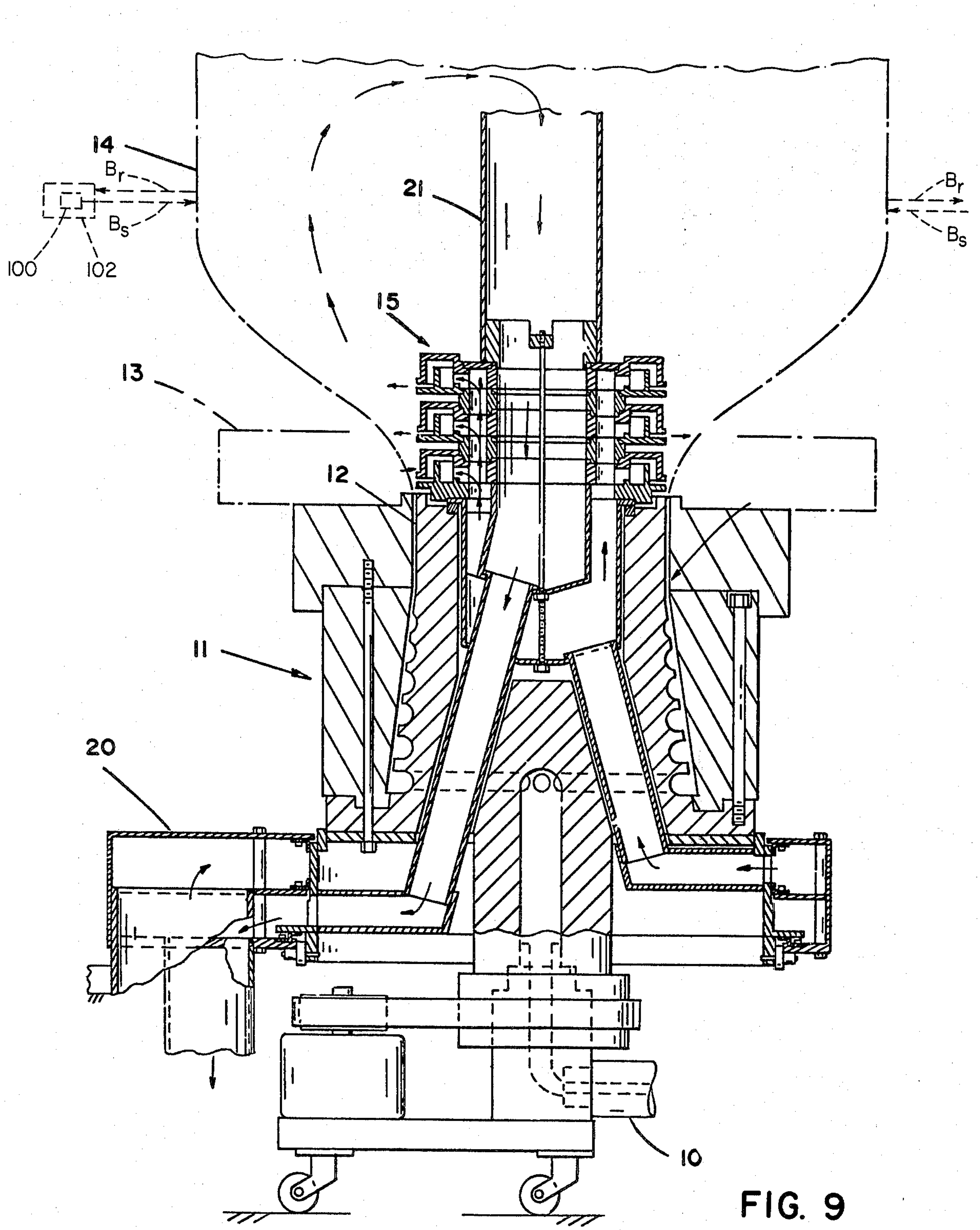

FIG. 9 is a vertical cross-section on an enlarged scale of the extrusion die with internal bubble cooling shown in FIG. 1.

STRUCTURE

Referring to FIG. 1, there is shown apparatus for producing blown film, such as for high quality plastic bags or sheeting. Plastic granules fed into a hopper are melted internally and fed by extruder 10 to die 4, where the plastic emerges from the annular die orifice 12 as a molten plastic tube 14. The tube is drawn upwardly by nip rolls 16, which stretch and flatten it. Other rolls transport the flattened tube to a storage roll (not shown). To evenly distribute circumferential irregularities in the thickness of the tube wall, caused by irregularities in die orifice 12, the die 11 is slowly rotated (about 1 rpm) about vertical axis Y.

After the tube emerges from die orifice 12, and while it is still molten, it expands in region 18 from the die diameter (e.g., 12 inches) to the desired final diameter, which may vary typically between 2 and 3 times the orifice diameter. Both external and internal cooling air rings 13, 15 direct cool flowing air against the tube in expansion region 18. Internal cooling air is introduced to internal air ring 15 through passages in the die. Spent, warmed air is withdrawn through planum 20, outlet 19 and pipe 21, and exits via passages in the die. The air passages through the die are shown in more detail in FIG. 9, and are described in more detail in my copending U.S. application Ser. No. 610,631, filed Sept. 5, 1975 and entitled INTERNAL AIR COOLING OF TUBULAR PLASTIC FILM now U.S. Pat. No. 4,236,884, issued Dec. 2, 1980. The tube is solidified at the so called frost line at level L, and has nearly reached its final diameter there.

Control over the final diameter of the tube is achieved by varying the flow rate at which internal cooling air is supplied. Greater rates of flow produce higher internal pressures and higher captured volume of air within the tube, thereby more greatly expanding the tube. The draw rate of nip rolls 16 also influences the shape of the expansion region 18, tending to raise or lower level L.

The final diameter is measured by two diametrically opposed optical sensor assemblies 22 (FIG. 2), positioned just above level L where the final diameter is first reached. Sensor assemblies 22 are supported on curved sensor arms 30 which pivot from lower ring 24. The lower ring in this embodiment is hung on support shafts 34, 36 from overhead platform 37 which rests on posts 39. In retrofit situations such an overhead platform may already exist.

Vertical adjustment of lower ring 24 and the sensor arms 30 carried thereon is provided by rotation of handle 42 fastened to shaft 34 (FIGS. 1, 3). Rotation handle 42 turns both shafts 34 and 36 in unison, and threads on the lower ends of both shafts engage threaded portions of feed blocks 23 fastened to lower ring 24, thereby raising and lowering the ring. Shafts 34, 36 turn in unison because sprockets 40 fixed to both shafts at their upper ends are coupled by upper chain 38 extending circumferentially around overhead platform 37. Additional idler sprockets 43 on upper ring 41 guide upper chain 38.

Referring to FIG. 2, there is mounted on each sensor arm 30 a wide beam transmitter 44 and a detector 46, which send and receive light beams 32. The arms are coupled together by lower chain 28 which engages sprocket elements 27 fastened to each sensor arm 30 at pivot shafts 26 (FIG. 4). The shafts are supported by bearings in blocks 25 fastened to lower ring 24. Lower chain 28 is guided at locations spaced 90 degrees from shafts 26 by beaming surfaces 31 of the frame (FIG. 3). Rotation of handle 29 fastened to one of pivot shafts 26 causes sensor arms 30 to rotate in unison toward or away from the tube.

Referring to FIGS. 4 and 5, each transmitter 44 consists of housing 82 containing incandescent bulb 74 with a single vertical filament 75 parallel to vertical axis Y of the tube and also to the tube walls. Filament 75 is located at the focus of Fresnel lens 76. Mask plate 84 with specially-shaped aperture 85 abuts lens 76, and both are supported behind round aperture 87 in the front face of housing 82 (FIG. 5). Photocell 80 is positioned on the backwall of housing 82 to measure the light intensity of bulb 74 and, with control circuitry (not shown), maintain the intensity at a constant value. Screw 89 is used to adjust the position of bulb 74. Bulb 74 is operated at half its rated power to increase life and reliability. The interior of housing 82 has a light-absorbing coating to assure that no light is reflected from the interior walls toward Fresnel lens 76.

Referring to FIGS. 4 and 6, detector 46 consists of housing 86 containing photocell 78 (Tandy Corp.; 0.375 inch square passivated silicon photo diode) mounted at the backwall. Window 85 with infrared filter 88 mounted behind it are positioned behind aperture 91 in housing 86. Spaced behind the window and filter and in front of photocell 78, are diffuser plate 90 and polarized filter 92. The interior of housing 86 has a light-absorbing coating to eliminate internal reflection.

Referring to FIGS. 1 and 8, the electrical outputs of detectors 46 are connected to control box 51 where they are applied to inputs 48 of amplifiers 50 and the outputs of amplifiers 50 are summed and filtered by amplifier 54. Switch 70 connects either the filtered photocell output or the output of manually adjustable potentiometer 72 to amplifier 55, which compares the selected output with a valve position feedback signal from valve sensor 64 (Pickering RVDT P/N 23330). The error signal generated by amplifier 55 is further amplified by power amplifier 66, the output of which drives valve motor 68 (Electrocraft E-660), which in turn, drives circular flapper valve 58 in the air supply line to internal cooling ring 15. Amplifiers 56 and 62 are operational amplifiers. Resistor and capacitor values are as shown in FIG. 8.

OPERATION

In operation, the circumference of tube 14 is maintained within a small tolerance of the desired value by adjusting the flow rate of air to the interior of the tube in proportion to the sensed deviation in circumference. Flow rate is adjusted by rotating flapper valve 58. The valve's normal angular excursion is plus or minus 30 degrees from a normal 30 degree inclination to the flow. Small angular deflections are all that is normally required after the system automatically settles to the set point value. For example, an angular movement of 2 degrees can change a nominal flow rate of 600 cfm by about 8 cfm, which in turn can change the circumference of a 32 inch diameter tube by about 0.10 inches.

To begin operation of the blown-film apparatus, the nominal diameter of the tube is set, with switch 70 in the manual position, by setting the position of sensor arms 30 such that the perpendicular distance between centers of beams 32 is the desired tube diameter. Then the flow output of the air blower (not shown) is adjusted such that, with valve 58 in its normal 30 degree inclination, roughly the correct flow is delivered to the tube interior to produce the desired tube size. Potentiometer 72 can be used in place of sensors 22 to adjust valve 58 and in turn tube size.

Automatic control of tube size is begun by moving switch 70 to the automatic position. An error in tube circumference as measured by sensors 22 generates at the input to amplifier 55 a valve position command signal. This signal is translated into corrective movement of flapper valve 58 by action of amplifier 55, output driver 66, valve motor 68, and feedback from sensor 64. Air flow is thereby automatically increased or reduced in proportion to the sensed error in tube circumference.

Changes in tube circumference are measured by processing the outputs of sensors 22. Each sensor measures the position of that portion of the wall of the tube intersected by one of beams 32. The position measurement is made by sensing the amount of light reaching detector 46. If undisturbed, each wall portion will occlude approximately 50% of each of wide beams 32. Radially inward movement of the wall exposes more of the beam to detector 46; outward movement occludes more of the beam.

As illustrated in FIG. 4, light beams 32 taper down in width from 2.5 inches at transmitters 44 to $\frac{3}{8}$ inch at detectors 46, and the beams are quite wide, being 1.25 inches wide at their intersection with the tube walls, so as to accommodate a deviation in tube wall position of 1.25 inches.

As illustrated in FIG. 7, by measuring tube circumference by computing the sum of the optically derived outputs of detectors 46, the measurement is made independent of sway of the tube. FIG. 7*a* illustrates the condition when the tube circumference is too small: both detectors see greater than 50% of beam 32, and the sum is greater than 100%; and an increase in air flow is signalled. In. FIG. 7*b*, the tube circumference is correct and there is no sway; both detectors see 50% of beam 32, and the sum is 100%. In FIG. 7*c*, the tube circumference is also correct but the tube exhibits rightward sway; the left detector sees greater than 50% of beam 32 and the right detector less than 50%, but the sum remains 100%, and no increase or decrease of air is signalled. Finally, in FIG. 7*d*, the tube circumference is too large, and both detectors see less than 50% of the beam, making the sum less than 100%, signally less air. To achieve independence from sway in the circumference measurement using this summing technique, the outputs of detectors 46 (or an electrically processed version of the outputs) are made substantially linearly proportional to the deviation in position of each wall portion.

In order to achieve this linearity (without electrical processing), beams 32 are given uniform energy at each increment (or vertical slice) along their horizontal width. This widthwise uniformity is achieved by giving a curved shape to aperture 85 in mask plate 84 of each transmitter 44 so as to compensate for the natural horizontal nonlinearity in energy produced by bulb 74 and Fresnel lens 76. If a perfect lens (Fresnel or other type) and proper focal distances are used, the curved shape would be that of an hourglass, less beam height in the center than at the edges. This shape simply corrects for the well-known cosine squared fall off in light intensity towards the edges of a lens. With the particular Fresnel lens selected for this embodiment, the light intensity increases towards the edges, and a barrel-shaped aperture shown in FIG. 5 is employed.

To make the circumference measurement also independent of sway in the beam direction, the beams are tapered in opposite directions (FIG. 2). (The left beam grows narrower from the top of the drawing to the bottom; the right beam grows narrower from bottom to top.) With this arrangement, one beam is occluded more due to sway in the beam direction (top to bottom on drawing), and the other beam is occluded less. Thus sway in the direction of the beams does not change the total occlusion nor the circumferential measurement, which is based on the total occlusion.

The difference between the deviations in position of the two diametrically opposed wall portions gives the change in tube diameter, which change, for a circular cross section, is proportional to the circumference. (The same is also true for non-circular cross sections if their overall shape remains the same as their size changes.) The difference between deviations is computed in this embodiment by forming the analog sum of the outputs of detectors 46. The sum provides the difference because of the polarity of the detectors, each producing a larger signal for radially inward movement of the respective wall portion. The sum is computed in analog manner by amplifier 54.

The light beams 32 enter each detector 46 through window 85 and infrared filter 88. The filter screens out infra-red light, and thereby makes the tube appear more opaque because it tends to be more transmissive of infrared light. Before striking photocell 78, the beam passes through diffuser plate 90 and polarized filter 92. Diffuser plate 90 spreads the received beam across the full receiving face of photocell 78 to provide maximum response to changes in received light. Polarized filter 92 screens out light of the polarization that is transmitted by the tube. Thus the polarized filter, like the infrared filter, also makes the tube appear more opaque.

The electrical outputs of photocells 78 are fed through the feedback control circuitry of FIG. 8 to produce changes in internal air flow to make corrections in tube diameter. Summer 52 sums the two photocell outputs after they are amplified by amplifiers 50, and 12 volts is added to the summed signal to produce a difference signal which is representative of the deviation from correct tube circumference (i.e., the difference signal is equal to zero when the sum of the transmission percentages received at detectors 46 is 100%). The difference signal is put through a first order low-pass filter (about 8 Hz break frequency) at amplifier 54 to filter out a 20 Hz characteristic flutter vibration in the tube wall position caused by the internal cooling air flow. The filtered difference signal (or the output of manually-adjustable potentiometer 72) is connected to amplifier 55 by switch 70.

The input to amplifier 55 acts as a valve position command signal, and is translated into rotation of flapper valve 58 by amplifier 55, power amplifier 66, motor 68 and a valve position feedback signal from sensor 64. The difference, or error signal, between the command and feedback signals drives power amplifier 66, which in turn drives valve position motor 68. Further filtering is provided by the capacitors in amplifier 55 to provide lead compensation to the feedback loop and to provide a further high frequency cutoff (about 160 Hz) in amplification of the error signal.

Stability of the automatic mode requires that the inner loop on valve position be provided. This eliminates the integral relationship between the signal applied to the motor and valve position. The inner loop gain and compensation is selected to give an open loop unity gain (0 dB) at about 15 Hz, thereby providing adequate stability. The main loop has an intergrator in it due to the relationship between flow rate and tube size, and the open loop gain in the main loop is set to give unity gain (0 dB) at about 0.3 Hz, which is sufficiently less than the calculated 1.3 Hz principal oscillation frequency of the tube to assure stability.

OTHER EMBODIMENTS

Other embodiments of the invention will occur to those skilled in the art. For example, more than two sensors could be positioned around the periphery of tube 14; this would better accommodate a situation where the tube takes on a non-circular cross section but retains the same circumference. No air flow correction would be desired in this situation as the width of the flattened tube would not have varied. A further example of possible variations would be to substitute other types of sensors, including laser scanners instead of the preferred transmitters, and ultrasonic sensors (e.g., such as the Ultrasonic Ranging System manufactured by Polaroid Corporation). With such ultrasonic sensors, referring to the dotted lines of FIGS. **7*b* and 9, the ultrasonic beam could be sent from emitter 100 along path $B_s$ and received by receiver 102** along path $B_r$ along the radial direction of the tube, with the transmitter and receiver at about the same position; the received beam would be the reflection back from the surface of the tube wall. Another variation would be to use a radially-directed detector known as the Opticator (manufactured in Sweden and sold by Selective Electronics, Inc. of North Carolina); this device emits either a laser or infrared LED beam.

In another embodiment two light source-detector sets can be arranged vertically on opposite sides of the vertical tube; for instance the inflated tube can be slightly indented at a point where it is solidified for locating either the light source or the detector on each side, with the intention that the beam will be occluded by the maximum diameter of the tube regardless of the particular level of the frost line where that diameter is first achieved.

The overhead support shown in FIG. 1 would preferably be eliminated unless such a support frame already exists on the apparatus. The overhead arrangement would be replaced by support structure resting on external air ring 13.

OTHER INVENTION

Subject matter disclosed but not claimed herein relating to the particular control circuitry connecting the photocells to the flapper valve was the invention of John J. Mulcahy.

What is claimed is:

1. Control apparatus for maintaining a desired circumference of a longitudinally extending thin-walled expanded plastic tube extruded from an annular die, comprising:

internal cooling air supply means connected to the interior of said tube for supplying a continuous flow of cooling air to said interior;

exhaust means for exhausting warmed air from said interior;

deviation sensing means for sensing the deviation in position of two or more circumferentially-spaced portions of the wall of said tube, said deviation sensing means including two or more energy-beam sensors positioned so as not to make physical contact with said wall and means for providing a variable electrical output for each said wall portion that is directly dependent upon the deviation in position of said portion, over a range of positions, from a predetermined set point, said output having a multiplicity of different output levels, each said level corresponding to a different said deviation in position;

control means for processing said electrical outputs to compute therefrom a difference signal representative of the change of the circumference of the tube from said desired circumference; and said deviation sensing means and said control means including means for making said difference signal insensitive to transverse sway of said tube, said sway leaving the tube circumference unchanged, valve means responsive to said difference signal for adjusting the open position of said valve means for controlling said continuous flow of air to the interior of said tube to reduce said difference signal, thereby to restore the circumference of the tube toward the desired value, whereby the size of the tube can be precisely controlled without physical contact with the tube and in the presence of the tube sway.

2. The control apparatus of claim 1 wherein said means for making said difference signal independent of sway includes means for making each said electrical output be substantially linearly proportional to the deviation in position of each portion over a range of positions from a predetermined set point, and said control means includes means for processing said electrical outputs to compute a difference signal dependent upon the relative distances between said wall portions, whereby the size of the tube can be controlled substantially independently of sway.

3. The control apparatus of claim 1 wherein each said sensor includes an optical transmitter for projecting an optical beam generally tangentially of said longitudinally extending tube wall, with the region of tangency corresponding to said wall portion, said beam having a substantial transverse cross sectional dimension in the direction of the radius of the tube, extending to each side of a predetermined position, to define said range of positions for the corresponding wall portion, and an optical detector for receiving said optical beam at a position beyond said region of tangency, each of said multiplicity of electrical output levels derived from said detector by said deviation sensing means corresponding to a different percentage by which the respective beam is occluded by the respective wall portion, and said control means computes said difference signal by summing said electrical outputs.

4. The control apparatus of claim 3 wherein each optical transmitter includes means for projecting a beam with uniform beam energy incrementally along said transverse direction, and each optical detector includes photocell means to convert the beam into said electrical output.

5. The control apparatus of claim 4 wherein said transmitter includes a light source, a lens, and masking means for varying the height of said beam in the direction parallel to the longitudinal axis of said tube at zones transversely outward from its center to correct for transverse nonuniformity in beam energy produced by said filament and lens.

6. The control apparatus of claim 1 or 2 wherein said control means includes means for producing said difference signal as an analog value and said valve means includes means for producing a change in said flow of air proportional to said analog signal.

7. The control apparatus of claim 3 wherein there are two said wall portions diametrically opposed one on either side of said tube, each said beam has a tapering cross section along the beam length, the direction of taper of the two beams being oppositely directed so that if sway occurs in the direction of beam length, to the extent one beam is occluded more due to such sway, the other is occluded less, said control means computes the difference between the electrical outputs for said two portions as said difference signal, said signal being independent of sway in the direction parallel to said beams.

8. The control apparatus of claim 2 wherein said deviation sensing means includes a plurality of supports each supporting one said sensor, said supports being moveable dependently between a plurality of different radial positions with respect to said tube wall to establish different selected set points for different size tubes.

9. The control apparatus of claim 8 wherein said supports comprise pivotal arms adapted to pivot in transverse planes relative to said tube, and coupling means for causing said arms to pivot in unison, whereby the transverse position of all said optical sensor assemblies with respect to said tube wall can be adjusted by making a single adjustment of said coupled pivoting arms.

10. The apparatus of claim 8 or 9 wherein each said sensor includes an optical transmitter for projecting an optical beam generally tangentially of said longitudinally extending tube wall, with the region of tangency corresponding to said wall portion associated with said sensor, and an optical detector for receiving said optical beam, the electrical output derived from each said optical detector being linearly proportional to the percentage by which the respective beam is occluded by the respective wall portions, and said control means includes means for summing said electrical outputs to compute said difference signal, whereby said supports can be adjusted such that, when said tube has said desired circumference, said beams are partially occluded by said wall portions at said regions of tangency and such that changes in the sum of the percentage occlusion of said beams is respresentative of the change in said circumference.

11. The control apparatus of claim 8 further comprising means for adjusting the longitudinal location of said sensors along said tube, said means including a support ring surrounding said tube, said supports extending from locations spaced around said support ring, and means for longitudinally moving said support ring.

12. The control apparatus of claim 10 further comprising means for adjusting the longitudinal location of said sensors along said tube, said means including a support ring surrounding said tube, said supports extending from locations spaced around said support ring, and means for longitudinally moving said support ring.

* * * * *